United States Patent
Li et al.

(10) Patent No.: US 11,690,124 B2
(45) Date of Patent: Jun. 27, 2023

(54) BEAM FAILURE RECOVERY REQUEST TRANSMISSION FOR REPETITIOUS COMMUNICATION

(71) Applicant: QUALCOMM Incorporated, San Diego, CA (US)

(72) Inventors: Qiaoyu Li, Beijing (CN); Chao Wei, Beijing (CN); Yu Zhang, San Diego, CA (US); Chenxi Hao, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 17/266,902

(22) PCT Filed: Aug. 7, 2019

(86) PCT No.: PCT/CN2019/099540
§ 371 (c)(1),
(2) Date: Feb. 8, 2021

(87) PCT Pub. No.: WO2020/029986
PCT Pub. Date: Feb. 13, 2020

(65) Prior Publication Data
US 2021/0298109 A1    Sep. 23, 2021

(30) Foreign Application Priority Data

Aug. 9, 2018 (WO) ............... PCT/CN2018/099580

(51) Int. Cl.
*H04W 76/19* (2018.01)
*H04B 7/06* (2006.01)
(Continued)

(52) U.S. Cl.
CPC .......... *H04W 76/19* (2018.02); *H04B 7/0626* (2013.01); *H04L 1/1607* (2013.01)

(58) Field of Classification Search
CPC combination set(s) only.
See application file for complete search history.

(56) References Cited

U.S. PATENT DOCUMENTS

2018/0110066 A1    4/2018   Luo et al.
2018/0227899 A1*   8/2018   Yu ..................... H04W 72/0413
(Continued)

FOREIGN PATENT DOCUMENTS

WO    2018129123 A1    7/2018
WO    2018129300 A1    7/2018
WO    2018136405       7/2018

OTHER PUBLICATIONS

Huawei et al., "Non-contention based random access for beam failure recovery in CA", R2-1801049, 3GPP TSG-RAN WG2#AH-1801, Vancouver, Canada, Jan. 22-26, 2018, Jan. 26, 2018, 3 Pages.
(Continued)

*Primary Examiner* — Derrick V Rose
(74) *Attorney, Agent, or Firm* — Harrity & Harrity, LLP

(57) ABSTRACT

Various aspects of the present disclosure generally relate to wireless communication. In some aspects, a user equipment (UE) may determine that a beam failure recovery request (BFRQ) is to be transmitted, wherein the BFRQ is associated with a plurality of repetitions of a communication; and transmit the BFRQ using a particular configuration based at least in part on whether the UE has successfully decoded one or more of the plurality of repetitions of the communication. Numerous other aspects are provided.

30 Claims, 5 Drawing Sheets

(51) Int. Cl.
    *H04L 1/16*    (2023.01)
    *H04L 1/1607*    (2023.01)

(56) References Cited

U.S. PATENT DOCUMENTS

| | | | | |
|---|---|---|---|---|
| 2018/0368124 | A1* | 12/2018 | Liu | H04L 1/00 |
| 2019/0320469 | A1* | 10/2019 | Huang | H04B 7/0456 |
| 2020/0221428 | A1* | 7/2020 | Moon | H04B 7/024 |

OTHER PUBLICATIONS

International Search Report and Written Opinion—PCT/CN2018/099580—ISA/EPO—dated May 8, 2019.
International Search Report and Written Opinion—PCT/CN2019/099540—ISA/EPO—dated Sep. 27, 2019.
Huawei., et al., "Beam Failure Recovery", 3GPP TSG RAN WG1 Meeting #89, 3GPP Draft, R1-1708135, 3rd Generation Partnership Project (3GPP), Mobile Competence Centre, 650, Route Des Lucioles, F-06921 Sophia-Antipolis Cedex, France, vol. RAN WG1, No. Hangzhou, China, May 15, 2017-May 19, 2017, 10 Pages, May 6, 2017 (May 6, 2017), XP051262270, Retrieved from the Internet: URL: http://www.3gpp.org/ftp/tsg_ran/WG1_RL1/TSGR1_89/Docs/ [retrieved on May 6, 2017], Section 2.
Huawei, et al., "Multiplexing Different Types of RSs for DL and UL", 3GPP TSG RAN WG1 Meeting #90bis, 3GPP Draft, R1-1717304, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, 6 Pages, Oct. 2, 2017 (Oct. 2, 2017), XP051352216, Retrieved from the Internet: URL: http://www.3gpp.org/ftp/tsgran/WG1_RL1/TSGR1_90b/Docs/ [retrieved on Oct. 2, 2017], Section 5.
Supplementary European Search Report—EP19848586—Search Authority—Munich—dated Apr. 12, 2022.

* cited by examiner

BEAM FAILURE RECOVERY REQUEST TRANSMISSION FOR REPETITIOUS COMMUNICATION

CROSS-REFERENCE TO RELATED APPLICATIONS

This application is a 371 national stage of PCT Application No. PCT/CN2019/099540 filed on Aug. 7, 2019, entitled "BEAM FAILURE RECOVERY REQUEST TRANSMISSION FOR REPETITIOUS COMMUNICATION," which claims priority to PCT Application No. PCT/CN2018/099580, filed on Aug. 9, 2018, entitled "BEAM FAILURE RECOVERY REQUEST TRANSMISSION FOR REPETITIOUS COMMUNICATION," which are hereby expressly incorporated by reference herein.

FIELD OF THE DISCLOSURE

Aspects of the present disclosure generally relate to wireless communication, and to techniques and apparatuses for beam failure recovery request transmission for repetitious communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a beam failure recovery request (BFRQ) is to be transmitted, wherein the BFRQ is associated with a plurality of repetitions of a communication; and transmitting the BFRQ using a particular configuration based at least in part on whether the UE has successfully decoded one or more of the plurality of repetitions of the communication.

In some aspects, a UE for wireless communication may include memory and one or more processors coupled to the memory. The memory and the one or more processors may be configured to determine that a beam failure recovery request (BFRQ) is to be transmitted, wherein the BFRQ is associated with a plurality of repetitions of a communication; and transmit the BFRQ using a particular configuration based at least in part on whether the UE has successfully decoded one or more of the plurality of repetitions of the communication.

In some aspects, a non-transitory computer-readable medium may store one or more instructions for wireless communication. The one or more instructions, when executed by one or more processors of a UE, may cause the one or more processors to determine that a beam failure recovery request (BFRQ) is to be transmitted, wherein the BFRQ is associated with a plurality of repetitions of a communication; and transmit the BFRQ using a particular configuration based at least in part on whether the UE has successfully decoded one or more of the plurality of repetitions of the communication.

In some aspects, an apparatus for wireless communication may include means for determining that a beam failure recovery request (BFRQ) is to be transmitted, wherein the BFRQ is associated with a plurality of repetitions of a communication; and means for transmitting the BFRQ using a particular configuration based at least in part on whether the apparatus has successfully decoded one or more of the plurality of repetitions of the communication.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It should be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
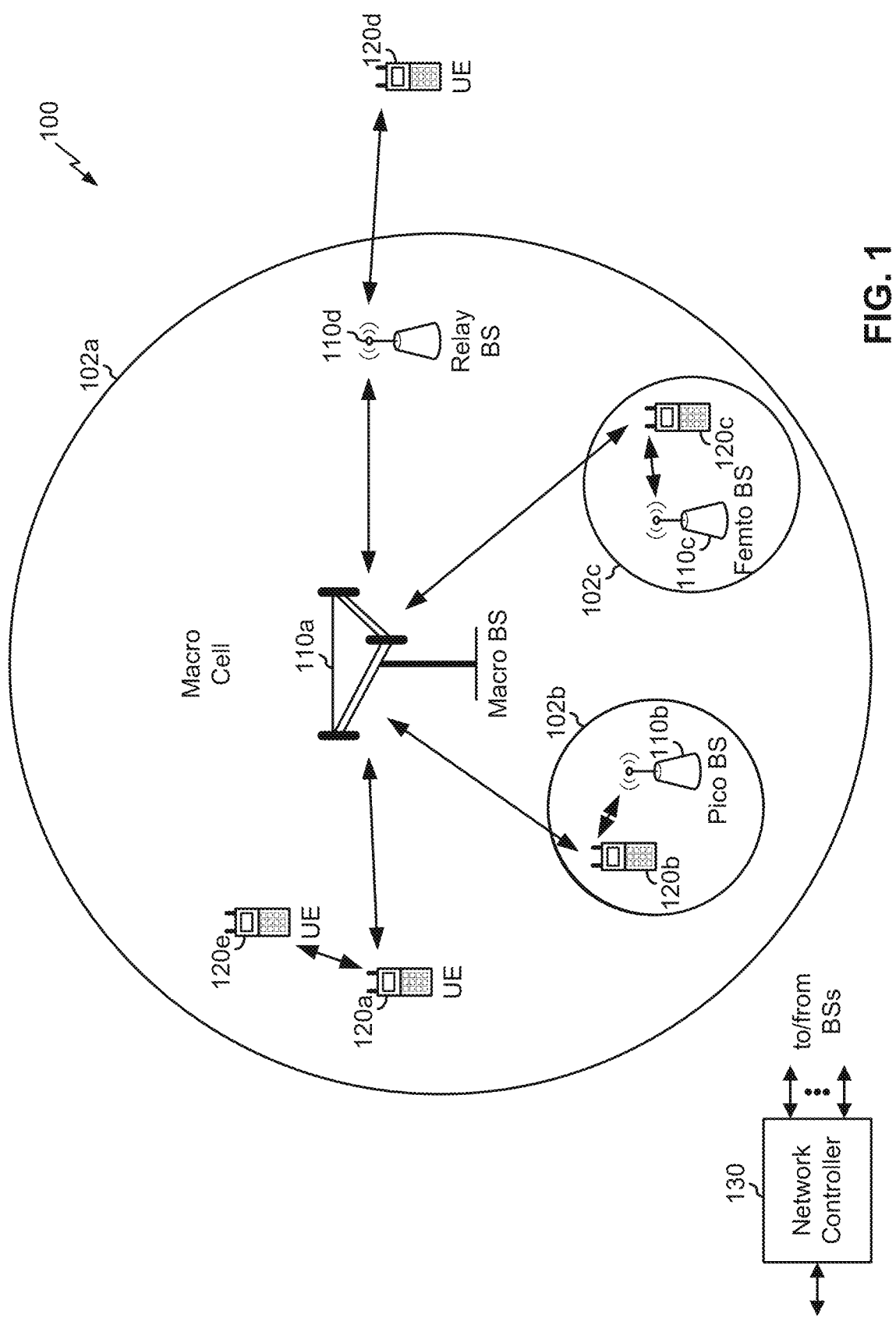
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or devices, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what was described with regard to FIG. 1.

Figure 2:
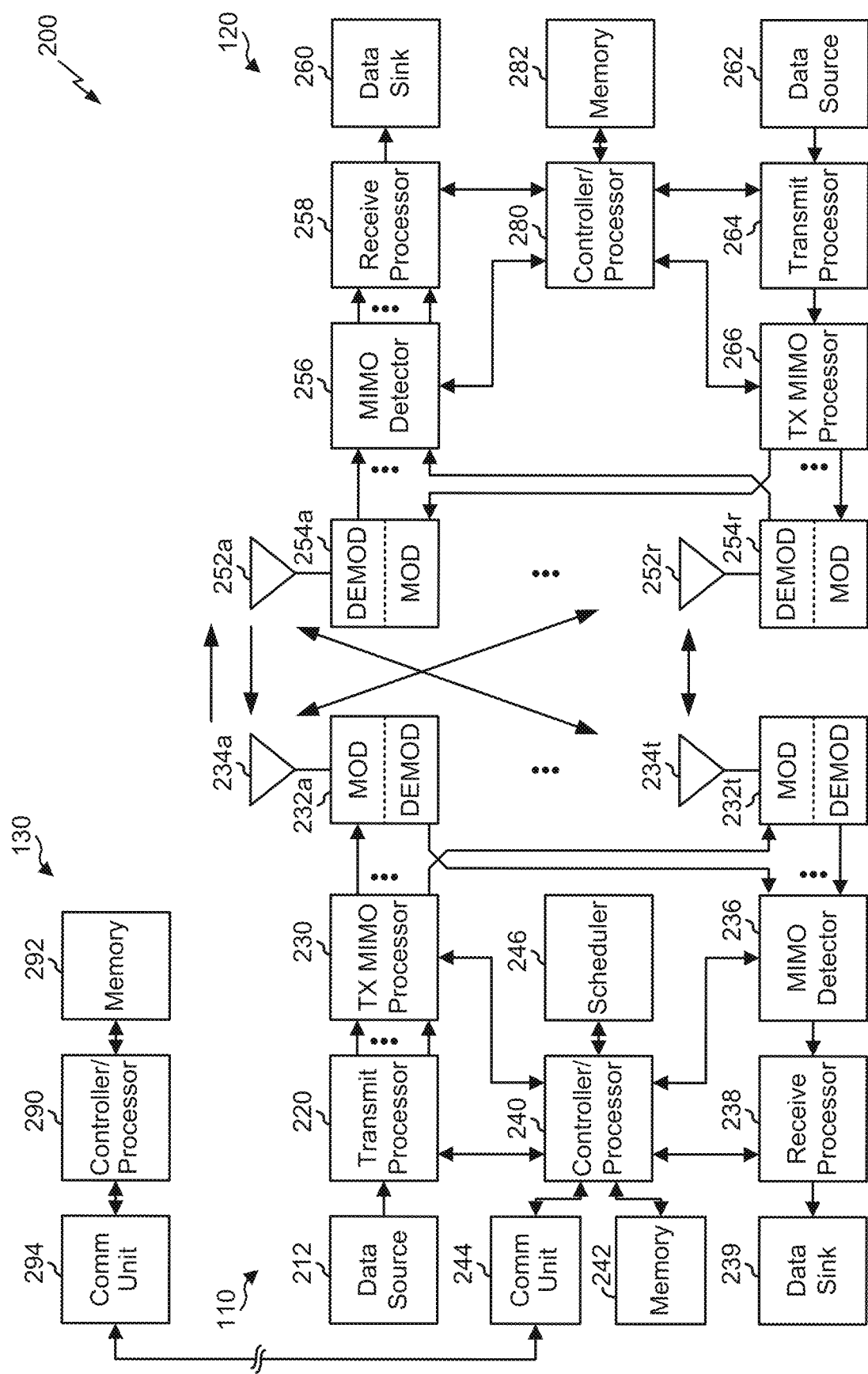
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with beam failure recovery request (BFRQ) transmission for repetitious communication, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that a beam failure recovery request (BFRQ) is to be transmitted, wherein the BFRQ is associated with a plurality of repetitions of a communication; means for transmitting the BFRQ using a particular configuration based at least in part on whether the UE has successfully decoded one or more of the plurality of repetitions of the communication; means for transmitting the BFRQ before an end of the plurality of repetitions of the communication based at least in part on the UE having successfully decoded the one or more of the plurality of repetitions of the communication; means for transmitting the BFRQ and an acknowledgment at or after an end of the plurality of repetitions of the communication based at least in part on the UE having successfully decoded the one or more of the plurality of repetitions of the communication; means for transmitting, at or after an end of the plurality of repetitions of the communication, the BFRQ and a negative acknowledgment for the plurality of repetitions of the communication based at least in part on the UE not having successfully decoded the one or more of the plurality of repetitions of the communication; means for transmitting channel state information in association with the BFRQ; means for transmitting an acknowledgment or a negative acknowledgment based at least in part on whether the UE successfully decoded the plurality of repetitions of the communication; means for receiving information identifying a periodicity associated with the BFRQ, wherein determining that the BFRQ is to be transmitted is based at least in part on determining that a number of consecutive beam failures has occurred within the periodicity; and/or the like. In some aspects, such means may include one or more components of UE 120 described in connection with FIG. 2.

As indicated above, FIG. 2 is provided as an example. Other examples may differ from what was described with regard to FIG. 2.

A UE may communicate with a BS using beamforming, wherein a transmission is transmitted or received using a beam. The BS and/or the UE may perform beam sweeping (e.g., using a synchronization signal block (SSB) and/or a reference signal (RS)-based beam sweeping technique) for beam measurement and reporting by the UE. In some cases, a UE may determine that a beam has failed (referred to herein as a beam failure). The UE may determine or declare a beam failure when all serving control channels of the UE fail based at least in part on a metric, such as a hypothetical downlink control channel block error rate (BLER). In some aspects, the beam failure determination may be performed in accordance with a periodicity, such as a periodicity associated with the SSB or the RS. In some aspects, when the UE determines that beam failure has occurred, the UE may provide information identifying one or more candidate beams on which to transmit a communication.

The UE may transmit a beam failure recovery request (BFRQ) based at least in part on detecting one or more beam failures. For example, if the number of consecutive beam failures detected by the UE satisfies a threshold (e.g., a configured threshold), then the UE may transmit the BFRQ. In some aspects, the UE may transmit the BFRQ using a contention-free resource, such as a contention-free random access resource. In some aspects, the UE may transmit the BFRQ with information identifying a candidate beam.

A BS may transmit a communication with a plurality of repetitions to enhance coverage for a UE. For example, the BS may transmit the communication over multiple subframes with repetitive payloads. The communication may use multiple (e.g., tens, hundreds, or thousands) repetitions. The UE may provide an acknowledgment (ACK) or a negative ACK (NACK) (ACK/NACK) via a feedback channel (e.g., a scheduled uplink channel) after the repetitions. In some cases, this technique may be used for Internet of Things devices, machine-type communication devices, and/or other low-power or low-coverage devices.

In some cases, beam failure may occur in the midst of a plurality of repetitions of a communication. Thus, a UE may determine that a BFRQ is to be transmitted in the midst of a plurality of repetitions of a communication. In such a case, the UE may or may not have successfully decoded the communication (e.g., using soft combining or a similar technique). Furthermore, the BS may not determine, in the midst of the plurality of repetitions, whether the UE has already successfully decoded the communication. This may be because the ACK/NACK is provided at the end of the plurality of repetitions. Thus, when the BS receives the BFRQ in the midst of the plurality of repetitions, the BS may not determine whether the UE has already successfully decoded the plurality of repetitions, which may lead to inefficient scheduling (e.g., unnecessary repetition, etc.).

Some techniques and apparatuses described herein provide particular configurations for transmitting the BFRQ based at least in part on whether the UE has successfully decoded a communication associated with a plurality of repetitions. For example, the UE may determine a resource for transmitting the BFRQ, whether to transmit the BFRQ with an ACK/NACK, whether to provide a new beam indicator with the BFRQ, whether to provide channel state information (CSI) with the BFRQ, and/or the like. The BS may determine whether to retransmit the communication, a configuration for retransmitting the communication, and/or the like based at least in part on the BFRQ and/or the ACK/NACK. Thus, the BS and/or the UE may more effectively utilize network resources, thereby improving throughput and reliability of communications with the UE.

Figure 3:
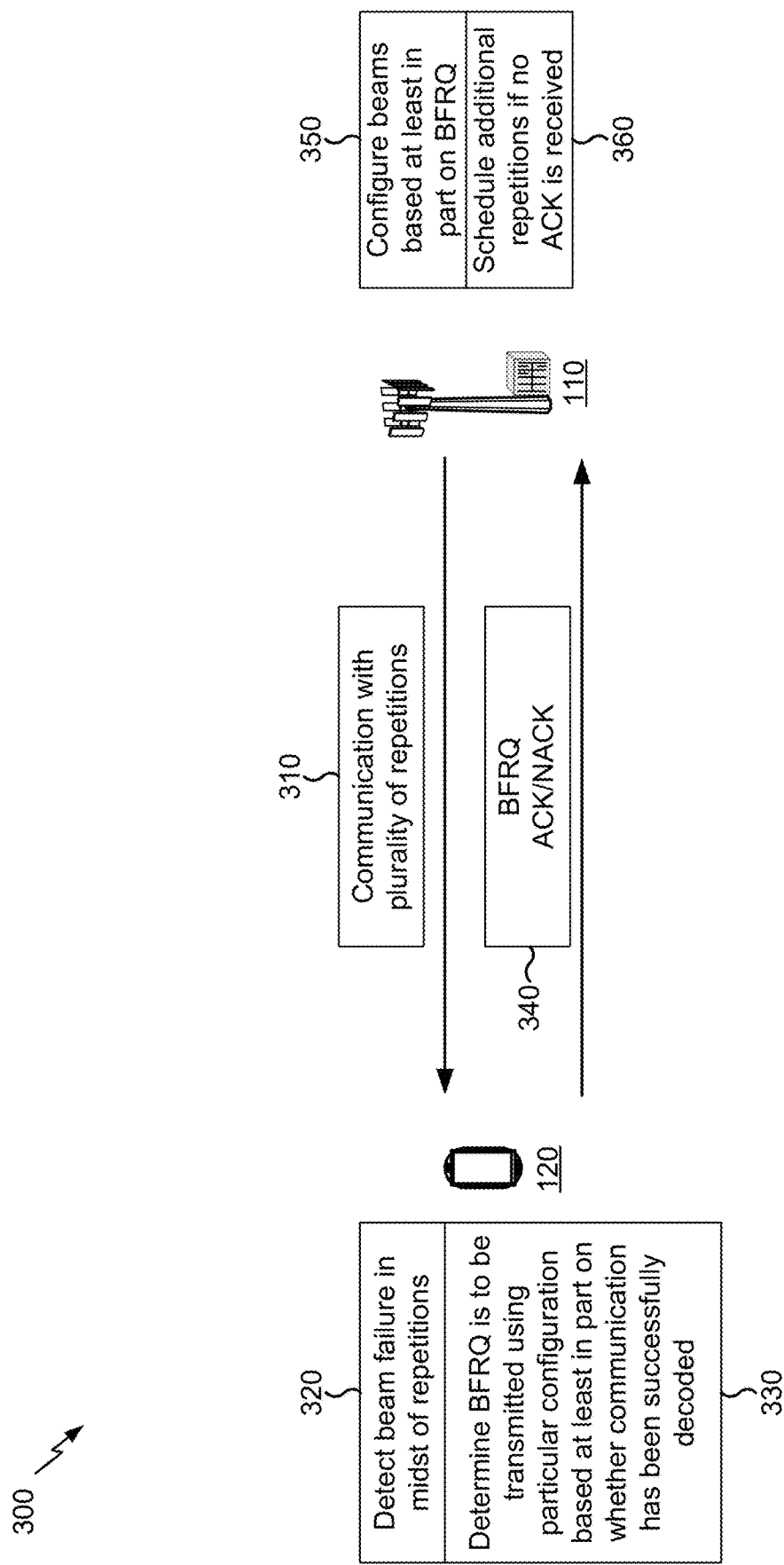
FIG. 3 is a diagram illustrating an example of transmitting a BFRQ for a repetitious communication, in accordance with various aspects of the present disclosure.

FIG. 3 is a diagram illustrating an example 300 of transmitting a BFRQ for a repetitious communication, in accordance with various aspects of the present disclosure.

As shown in FIG. 3, and by reference number 310, a BS 110 may transmit a communication with a plurality of repetitions to a UE 120. In some aspects, the communication may be a data communication (e.g., a shared channel, such as a physical downlink shared channel (PDSCH), a transport block, and/or the like). In some aspects, the communication may be a control communication (e.g., a control channel, such as a physical downlink control channel (PDCCH), and/or the like). In some aspects, the communication may be a reference signal, a synchronization signal, a synchronization signal block, and/or the like.

The communication may be associated with a plurality of repetitions. For example, the communication may be associated with a coverage enhancement scheme whereby the communication is retransmitted multiple, tens, hundreds, or thousands of times. In some aspects, a repetition may occupy a subframe, a part of a subframe, or multiple subframes.

In some aspects, the UE 120 may provide information identifying one or more candidate beams to the BS 110. For example, the UE 120 may provide the information identifying the one or more candidate beams based at least in part on a beamsweeping procedure. The BS 110 may use a beam of the one or more candidate beams to configure communications with the UE 120 based at least in part on a BFRQ, as described in more detail below.

As shown by reference number 320, the UE 120 may detect one or more beam failures in the midst of the plurality of repetitions. For example, the UE 120 may detect the beam failure when one or more serving control channels fail based at least in part on a hypothetical PDCCH BLER metric. In some aspects, the UE 120 may detect the beam failure based at least in part on a periodicity. In some aspects, the periodicity may be associated with a reference signal (e.g., a periodic CSI-RS), a synchronization signal (e.g., a synchronization signal block), and/or the like. In some aspects, the periodicity may be based at least in part on signaling from the BS 110, as described in more detail in connection with block 410 of FIG. 4.

As shown by reference number 330, the UE 120 may determine that a BFRQ is to be transmitted. For example, the UE 120 may determine that a condition for the BFRQ is satisfied. In some aspects, the UE 120 may determine that the condition is satisfied based at least in part on a number of consecutive beam failures satisfying a threshold.

As further shown, the UE 120 may determine that the BFRQ is to be transmitted using a particular configuration. In some aspects, the UE 120 may determine that the BFRQ is to be transmitted using the particular configuration, or may determine the particular configuration, based at least in part on whether the communication has been successfully decoded. For example, the UE 120 may attempt to decode the repetitions that have been received before determining that the BFRQ is to be transmitted. The UE 120 may determine that the BFRQ is to be transmitted using the particular configuration, or may determine the particular configuration, based at least in part on whether the decoding the repetitions, that have been received before determining that the BFRQ is to be transmitted, is successful. As shown by reference number 340, the UE 120 may transmit the BFRQ and/or optionally an ACK/NACK (i.e., an ACK or a NACK) for the communication. Various aspects of the particular configuration, the BFRQ, and/or the ACK/NACK are described below in turn.

In some aspects, the UE 120 may determine that the BFRQ is to be transmitted when the UE 120 determines that the BFRQ is to be transmitted. For example, the UE 120 may determine that the BFRQ is to be transmitted before the end of the plurality of repetitions when the UE 120 has indicated one or more candidate beams to the BS 110. As another example, the UE 120 may determine that the BFRQ is to be transmitted before the end of the plurality of repetitions when the UE 120 has successfully decoded one or more repetitions of the plurality of repetitions (e.g., one or more repetitions that the UE 120 has already received before determining that the BFRQ is to be transmitted). In such a case, the BS 110 may terminate the plurality of repetitions and/or may schedule a new downlink beam using one or more of the one or more candidate beams, which conserves network resources that would be used to provide the remainder of the repetitions.

In some aspects, the UE 120 may determine that the BFRQ is to be transmitted at or after an end of the plurality of repetitions. For example, the UE 120 may determine that the BFRQ is to be transmitted at or after the end of the plurality of repetitions when the UE 120 has successfully decoded the communication. In such a case, the UE 120 may transmit the BFRQ with an ACK for the communication. In some aspects, the BS 110 may finish the originally scheduled repetitions (e.g., since the UE 120 did not transmit the BFRQ until the end of the plurality of repetitions), which may conserve BS resources that would otherwise be used to determine that the repetitions are to be terminated early.

In some aspects, the UE 120 may determine that the BFRQ is to be transmitted at or after the end of the plurality of repetitions based at least in part on the UE 120 not having successfully decoded the communication at a time of determining that the BFRQ is to be transmitted. In such a case, the UE 120 may wait until the plurality of repetitions is finished, and may attempt to decode the plurality of repetitions after all repetitions are received. If the UE 120 decodes the communication using the plurality of repetitions, the UE 120 may transmit the BFRQ and an ACK (e.g., after decoding the plurality of repetitions). If the UE 120 cannot decode the communication using the plurality of repetitions, the UE 120 may provide the BFRQ and a NACK.

In some aspects, the UE 120 may provide channel state information to the BS 110. For example, the UE 120 may provide channel state information when decoding is not successful. In some aspects, the channel state information may identify a signal to noise ratio (SNR), such as a combined SNR or an average SNR during the plurality of repetitions. In some aspects, the channel state information may identify a reference signal received power (RSRP), such as a combined RSRP or an average RSRP during the plurality of repetitions. In some aspects, the channel state information may identify a number of subframes or repetitions (e.g., an exact number of subframes or repetitions, an approximate number of subframes or repetitions, etc.) with a measurement that satisfies a threshold.

In some aspects, the UE 120 may determine that the BFRQ is to be transmitted using a particular resource, such as a particular random access channel (RACH) resource, a particular preamble sequence, and/or the like. For example, when the UE 120 has successfully decoded the communication, the UE 120 may transmit the BFRQ using a particular RACH resource that indicates that the UE 120 has successfully decoded the BFRQ. In this way, the UE 120 may conserve resources that would otherwise be used to indicate the ACK/NACK for the communication.

In some aspects, the UE 120 may provide an indication of channel state information to the BS 110. For example, the UE 120 may provide the BFRQ using a particular resource (e.g., a particular RACH resource, a particular preamble sequence, etc.) that is associated with particular channel state information. In some aspects, the particular resource may indicate a number of subframes (e.g., an approximate number of subframes, an exact number of subframes, etc.) received before the BFRQ transmission condition was satisfied, a measurement (e.g., SNR, RSRP, etc.) before the BFRQ transmission was triggered, or other channel state information. In some aspects, the UE 120 may provide the indication of channel state information based at least in part on successful decoding of the repetitions before the BFRQ transmission was triggered.

In some aspects, the UE 120 may provide the indication of channel state information based at least in part on unsuccessful decoding of the repetitions before the BFRQ transmission was triggered. In such a case, the BS 110 may schedule further repetitions of the communication, where a number of the repetitions is based at least in part on the channel state information.

In some aspects, the UE 120 may determine whether the BFRQ is to be transmitted after an end of the plurality of repetitions. For example, assume that the plurality of repetitions includes R repetitions, and assume a current repetition number is r. In that case, when r≥R (e.g., when the end of the plurality of repetitions has been reached), the UE 120 may determine whether a BFRQ is to be transmitted. If the BFRQ is to be transmitted, then the UE 120 may transmit the BFRQ. In some aspects, the UE 120 may provide an ACK/NACK based at least in part on a result of decoding the plurality of repetitions. In some aspects, when r<R, the UE 120 may not transmit the BFRQ, even if a condition for transmitting the BFRQ is satisfied. In some cases, the above-described relationships may use r>R and r≤R.

As shown by reference number 350, the BS 110 may configure one or more beams based at least in part on the BFRQ. For example, when the BS 110 has received information identifying one or more candidate beams for the UE 120, the BS 110 may configure one or more beams using the information identifying the one or more candidate beams, as described in more detail elsewhere herein.

As shown by reference number 360, the BS 110 may schedule additional repetitions of the communication if an ACK is not received. For example, in some cases, the UE 120 may provide an explicit or implicit indication that decoding the plurality of repetitions was not successful. In such a case, the BS 110 may schedule additional repetitions of the communication. In some aspects, the BS 110 may not schedule additional repetitions of the communication (e.g., when the BS 110 receives an explicit or implicit ACK for the communication). In some aspects, the BS 110 may cease transmitting repetitions of a communication (e.g., when the BS 110 receives an explicit or implicit ACK before an end of the repetitions of the communication). In this way, the UE 120 and the BS 110 more efficiently utilize network resources and provide configuration of the BFRQ for a repetitious communication.

As indicated above, FIG. 3 is provided as an example. Other examples may differ from what was described with respect to FIG. 3.

Figure 4:
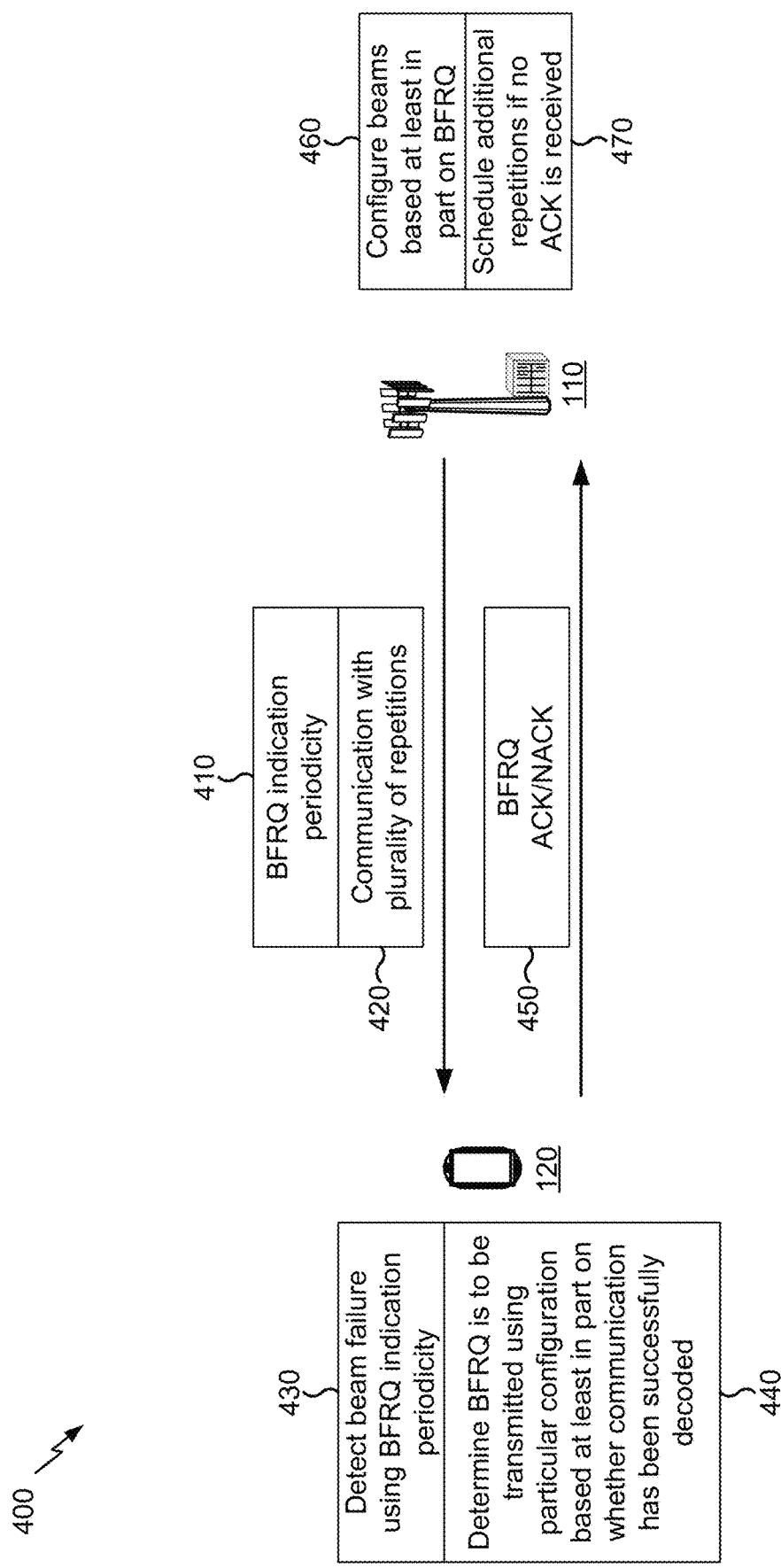
FIG. 4 is a diagram illustrating an example of transmitting a BFRQ for a repetitious communication, in accordance with various aspects of the present disclosure.

FIG. 4 is a diagram illustrating an example 400 of transmitting a BFRQ for a repetitious communication, in accordance with various aspects of the present disclosure.

As shown in FIG. 4, and by reference number 410, the BS 110 may transmit information identifying a BFRQ indication periodicity to the UE 120. For example, in some cases, the BS 110 may configure a BFRQ indication periodicity of the UE 120. In some aspects, the BS 110 may transmit the information identifying the BFRQ indication periodicity using downlink control information (DCI), a medium access control control element (MAC-CE), radio resource control (RRC) signaling, and/or the like.

The BFRQ indication periodicity may identify a periodicity for which the UE 120 is to carry out beam failure detection, such as a number of subframes for which the UE 120 is to perform beam failure detection. In some aspects, the information identifying the BFRQ indication periodicity may explicitly identify the periodicity, for example, by indicating an exact number of subframes in a single period. In some aspects, the information identifying the BFRQ indication periodicity may implicitly identify the periodicity, for example, by configuring one or more bits to indicate a number of subframes (e.g., an approximate number of subframes, an exact number of subframes, etc.) in a single period.

As shown by reference number 420, the BS 110 may transmit a communication with a plurality of repetitions to the UE 120, as described in more detail in connection with block 310 of FIG. 3.

As shown by reference number 430, the UE 120 may detect one or more beam failures using the BFRQ indication periodicity. For example, the UE 120 may perform beam failure detection using the BFRQ indication periodicity configured by the BS 110. As shown by reference number 440, the UE 120 may determine that a BFRQ is to be transmitted using a particular configuration based at least in part on whether the communication has been successfully decoded, and, as shown by reference number 450, the UE 120 may transmit the BFRQ. For example, the UE 120 may determine that a condition for the BFRQ is satisfied with regard to one or more periods of the BFRQ indication periodicity. In some aspects, the UE 120 may determine that the BFRQ is to be transmitted when the condition for the BFRQ is satisfied (e.g., irrespective of whether the communication is complete). In some aspects, the UE 120 may transmit an ACK/NACK for the communication (e.g., when the plurality of repetitions are complete).

As shown by reference number 450, the UE 120 may transmit the BFRQ. For example, the UE 120 may transmit the BFRQ when the UE 120 determines that the BFRQ is to transmitted. As shown by reference number 460, the BS 110 may configure one or more beams based at least in part on the BFRQ. As shown by reference number 470, the BS 110 may schedule additional repetitions if no ACK is received for the communication. For example, in some cases, the UE 120 may provide an explicit or implicit indication that decoding the plurality of repetitions was not successful. In such a case, the BS 110 may schedule additional repetitions of the communication. In some aspects, the BS 110 may not schedule additional repetitions of the communication (e.g., when the BS 110 receives an explicit or implicit ACK for the communication). In some aspects, the BS 110 may cease transmitting repetitions of a communication (e.g., when the BS 110 receives an explicit or implicit ACK before an end of the repetitions of the communication). In this way, the UE 120 and the BS 110 more efficiently utilize network resources and provide configuration of the BFRQ indication periodicity for a repetitious communication.

As indicated above, FIG. 4 is provided as an example. Other examples may differ from what was described with respect to FIG. 4.

Figure 5:
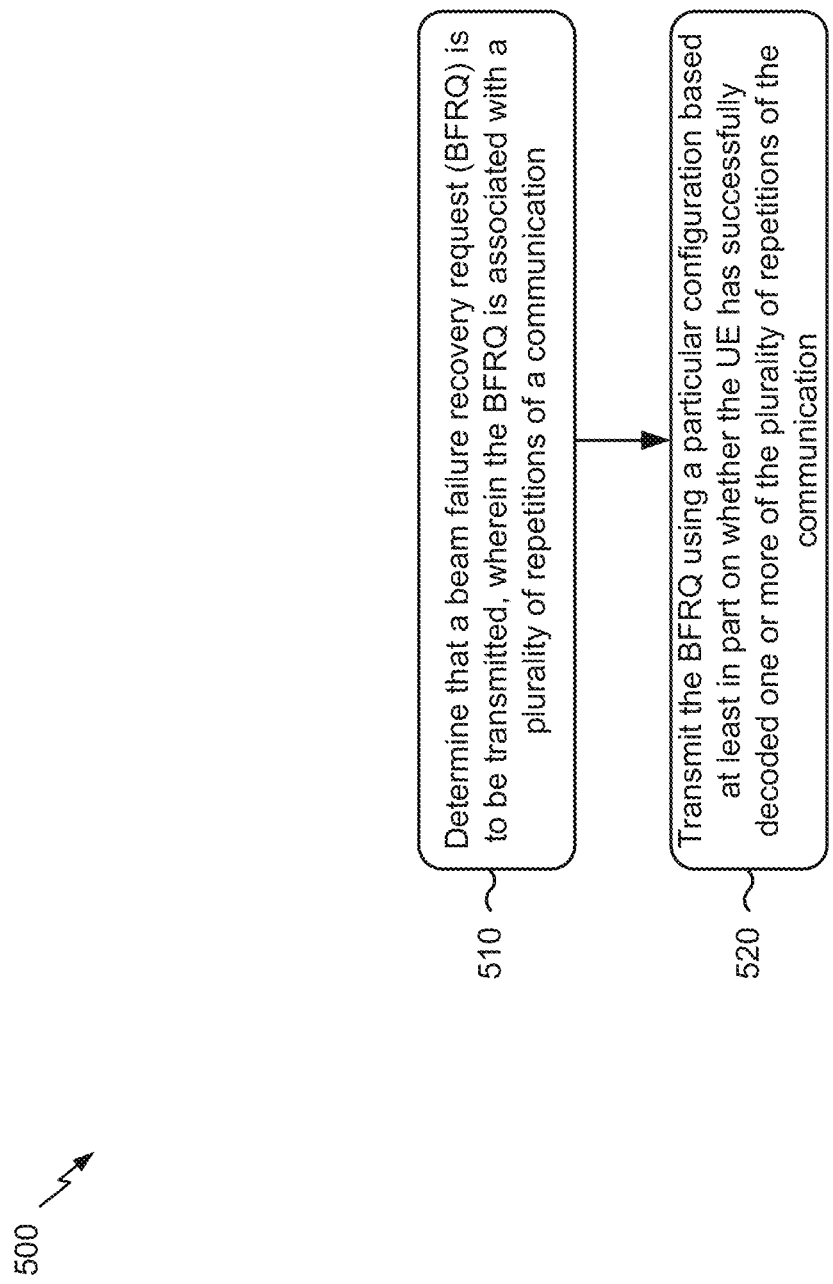
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120) performs transmission of a BFRQ for a repetitious communication.

As shown in FIG. 5, in some aspects, process 500 may include determining that a beam failure recovery request (BFRQ) is to be transmitted, wherein the BFRQ is associated with a plurality of repetitions of a communication (block 510). For example, the UE (e.g., using antenna 252, DEMOD 254, MIMO detector 256, receive processor 258, controller/processor 280, and/or the like) may determine that a BFRQ is to be transmitted. In some aspects, the UE may determine that the BFRQ is to be transmitted based at least in part on a condition for the BFRQ being satisfied. The BFRQ may be associated with a plurality of repetitions of a communication. For example, the UE may determine that the BFRQ is to be transmitted in the midst of the plurality of repetitions, in some cases.

As shown in FIG. 5, in some aspects, process 500 may include transmitting the BFRQ using a particular configuration based at least in part on whether the UE has successfully decoded one or more of the plurality of repetitions of the communication (block 520). For example, the UE (e.g., using controller/processor 280, transmit processor 264, TX MIMO processor 266, MOD 254, antenna 252, and/or the like) may transmit the BFRQ using a particular configuration based at least in part on whether the UE has successfully decoded one or more repetitions of the plurality of repetitions of the communication. This is described in more detail in connection with FIGS. 3 and 4.

Process 500 may include additional aspects, such as any single aspect or any combination of aspects described below and/or in connection with one or more other processes described elsewhere herein.

In a first aspect, the determination is before an end of the plurality of repetitions of the communication. In a second aspect, alone or in combination with the first aspect, the particular configuration is based at least in part on whether a new beam for the plurality of repetitions of the communication is to be indicated. In a third aspect, alone or in combination with the first aspect and/or the second aspect, the UE may transmit the BFRQ before an end of the plurality of repetitions of the communication based at least in part on the UE having successfully decoded the one or more of the plurality of repetitions of the communication. In a fourth aspect, alone or in combination with any one or more of the first through third aspects, the particular configuration uses a resource that indicates that the UE has successfully decoded the one or more of the plurality of repetitions of the communication.

In a fifth aspect, alone or in combination with any one or more of the first through fourth aspects, the UE may transmit the BFRQ and an acknowledgment at or after an end of the plurality of repetitions of the communication based at least in part on the UE having successfully decoded the one or more of the plurality of repetitions of the communication.

In a sixth aspect, alone or in combination with any one or more of the first through fifth aspects, the UE may transmit, at or after an end of the plurality of repetitions of the communication, the BFRQ and a negative acknowledgment for the plurality of repetitions of the communication based at least in part on the UE not having successfully decoded the one or more of the plurality of repetitions of the communication. In a seventh aspect, alone or in combination with any one or more of the first through sixth aspects, the UE may transmit channel state information in association with the BFRQ.

In an eighth aspect, alone or in combination with any one or more of the first through seventh aspects, the channel state information relates to at least one of a combined measurement during the plurality of repetitions of the communications or a number of received subframes with a measurement that satisfies a threshold. In a ninth aspect, alone or in combination with any one or more of the first through eighth aspects, the determination is performed after an end of the plurality of repetitions of the communication.

In a tenth aspect, alone or in combination with any one or more of the first through ninth aspects, the UE may transmit an acknowledgment or a negative acknowledgment based at least in part on whether the UE successfully decoded the plurality of repetitions of the communication. In an eleventh aspect, alone or in combination with any one or more of the first through tenth aspects, the UE may receive information identifying a periodicity associated with the BFRQ, wherein determining that the BFRQ is to be transmitted is based at least in part on determining that a number of consecutive beam failures has occurred within the periodicity. In a twelfth aspect, alone or in combination with any one or more of the first through eleventh aspects, the information identifying the periodicity explicitly identifies a length of the periodicity. In a thirteenth aspect, alone or in combination with any one or more of the first through twelfth aspects, the information identifying the periodicity includes at least one bit that indicates a length of the periodicity. In a fourteenth aspect, alone or in combination with any one or more of the first through thirteenth aspects, the information identifying the periodicity is received via one of downlink control information, a media access control element, or radio resource control signaling. In a fifteenth aspect, alone or in combination with any one or more of the first through fourteenth aspects, the particular configuration uses a resource that indicates channel state information.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
    a memory; and
    one or more processors coupled to the memory, wherein the one or more processors are configured to:
        determine that a beam failure recovery request (BFRQ) is to be transmitted, wherein the BFRQ is associated with a plurality of repetitions of a communication; and
        transmit the BFRQ using a particular configuration based at least in part on one or more repetitions, of the plurality of repetitions, being successfully decoded before the determination that the BFRQ is to be transmitted.

2. The UE of claim 1, wherein the one or more processors, to determine that the BFRQ is to be transmitted, are configured to:
    determine, is before an end of the plurality of repetitions, that the BFRQ is to be transmitted.

3. The UE of claim 1, wherein the particular configuration is based at least in part on whether a new beam for the plurality of repetitions of the communication is to be indicated.

4. The UE of claim 1, wherein the one or more processors, to transmit the BFRQ using the particular configuration, are configured to:
    transmit the BFRQ before an end of the plurality of repetitions.

5. The UE of claim 1, wherein the particular configuration uses a resource that indicates that the UE has successfully decoded the one or more repetitions.

6. The UE of claim 1, wherein the one or more processors, to transmit the BFRQ using the particular configuration, are configured to:
    transmit the BFRQ and an acknowledgment at or after an end of the plurality of repetitions based at least in part on the one or more repetitions being successfully decoded.

7. The UE of claim 1, wherein the one or more processors, to transmit the BFRQ using the particular configuration, are configured to:
    transmit, at or after an end of the plurality of repetitions, the BFRQ and a negative acknowledgment for the plurality of repetitions based at least in part on the communication not being successfully decoded.

8. The UE of claim 1, wherein the one or more processors are further configured to:
    transmit channel state information in association with the BFRQ.

9. The UE of claim 8, wherein the channel state information relates to at least one of a combined measurement during the plurality of repetitions or a quantity of received subframes with a measurement that satisfies a threshold.

10. The UE of claim 1, wherein the particular configuration uses a resource that indicates channel state information.

11. The UE of claim 1, wherein the one or more processors, to determine that the BFRQ is to be transmitted, are configured to:
    determine, after an end of the plurality of repetitions, that the BFRQ is to be transmitted.

12. The UE of claim 11, wherein the one or more processors are further configured to:
    transmit an acknowledgment or a negative acknowledgment based at least in part on whether the communication is successfully decoded.

13. The UE of claim 1, wherein the one or more processors are further configured to:
    receive information indicative of a periodicity associated with the BFRQ; and
    wherein the one or more processors, to determine that the BFRQ is to be transmitted, are configured to:
        determine that the BFRQ is to be transmitted based at least in part on a quantity of consecutive beam failures within the periodicity.

14. The UE of claim 13, wherein the information indicative of the periodicity explicitly indicates a length of the periodicity.

15. The UE of claim 13, wherein the information indicative of the periodicity includes at least one bit that indicates a length of the periodicity.

16. The UE of claim 13, wherein the one or more processors, to receive the information indicative of the periodicity, are configured to:
    receive the information indicative of the periodicity via one of downlink control information, a media access control element, or radio resource control signaling.

17. A method of wireless communication performed by a user equipment (UE), comprising:
    determining that a beam failure recovery request (BFRQ) is to be transmitted, wherein the BFRQ is associated with a plurality of repetitions of a communication; and
    transmitting the BFRQ using a particular configuration based at least in part on the UE having successfully decoded one or more repetitions, of the plurality of repetitions, before determining that the BFRQ is to be transmitted.

18. A non-transitory computer-readable medium having a set of instructions stored thereon for wireless communication, the set of instructions comprising:
one or more instructions that, when executed by one or more processors of a user equipment (UE), cause the UE to:
determine that a beam failure recovery request (BFRQ) is to be transmitted, wherein the BFRQ is associated with a plurality of repetitions of a communication; and
transmit the BFRQ using a particular configuration based at least in part on one or more repetitions, of the plurality of repetitions, being successfully decoded before the determination that the BFRQ is to be transmitted.

19. An apparatus for wireless communication, comprising:
means for determining that a beam failure recovery request (BFRQ) is to be transmitted, wherein the BFRQ is associated with a plurality of repetitions of a communication; and
means for transmitting the BFRQ using a particular configuration based at least in part on one or more repetitions, of the plurality of repetitions, being successfully decoded before the determination that the BFRQ is to be transmitted.

20. The method of claim 17, wherein the determination is performed before an end of the plurality of repetitions.

21. The method of claim 17, wherein the particular configuration is based at least in part on whether a new beam for the plurality of repetitions of the communication is to be indicated.

22. The method of claim 17, wherein transmitting the BFRQ using the particular configuration comprises:

transmitting the BFRQ before an end of the plurality of repetitions.

23. The method of claim 17, wherein the particular configuration uses a resource that indicates that the UE has successfully decoded the one or more repetitions.

24. The method of claim 17, wherein transmitting the BFRQ using the particular configuration comprises:
transmitting the BFRQ and an acknowledgment at or after an end of the plurality of repetitions based at least in part on the UE having successfully decoded the one or more repetitions.

25. The method of claim 17, wherein transmitting the BFRQ using the particular configuration comprises:
transmitting, at or after an end of the plurality of repetitions, the BFRQ and a negative acknowledgment for the plurality of repetitions based at least in part on the UE not having successfully decoded the communication.

26. The method of claim 17, further comprising:
transmitting channel state information in association with the BFRQ.

27. The method of claim 26, wherein the channel state information relates to at least one of a combined measurement during the plurality of repetitions or a quantity of received subframes with a measurement that satisfies a threshold.

28. The method of claim 17, wherein the particular configuration uses a resource that indicates channel state information.

29. The method of claim 17, wherein the determination is performed after an end of the plurality of repetitions.

30. The method of claim 29, wherein transmitting the BFRQ using the particular configuration comprises:
transmitting an acknowledgment or a negative acknowledgment based at least in part on whether the UE has successfully decoded the communication.

* * * * *